No. 796,574. PATENTED AUG. 8, 1905.
J. W. FUQUA.
NUT LOCK.
APPLICATION FILED JAN. 28, 1905.

Witnesses
O. E. Murray.
M. A. Schmidt.

John W. Fuqua,
Inventor by Milo B. Stevens and Co.
Attorneys.

UNITED STATES PATENT OFFICE.

JOHN W. FUQUA, OF BLUERIDGE SPRINGS, VIRGINIA.

NUT-LOCK.

No. 796,574. Specification of Letters Patent. Patented Aug. 8, 1905.

Application filed January 28, 1905. Serial No. 243,042.

*To all whom it may concern:*

Be it known that I, JOHN W. FUQUA, a citizen of the United States, residing at Blueridge Springs, in the county of Botetourt and State of Virginia, have invented new and useful Improvements in Nut-Locks, of which the following is a specification.

My invention relates to nut-locks; and it consists in an improved article of this kind which is especially adapted for use in connection with a rail-joint.

Figure 1:
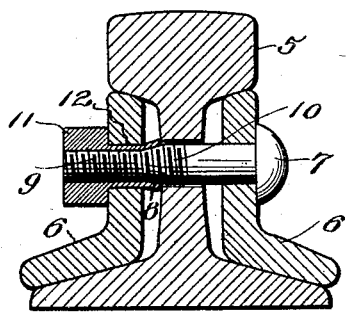
Figure 2:
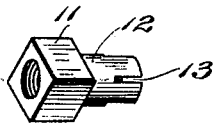

In the accompanying drawings, Figure 1 is a vertical section of a rail and the fish-plates, showing the application of the invention. Fig. 2 is a perspective view of the nut.

Referring specifically to the drawings, 5 denotes the rail, and 6 the fish-plates. The bolt for fastening these parts together is indicated at 7. The bolt tapers, as at 8, whereby it is formed into two sections 9 and 10, respectively, having different diameters, the first-mentioned being the smallest. Both of these sections are threaded.

The nut is indicated at 11 and is formed with a sleeve 12, which extends from the base thereof. The nut is threaded as usual, and the threads also extend through the sleeve. Near its outer end the sleeve is slitted, as at 13, for a purpose to be described.

In use the bolt is passed through the rail and fish-plates, as usual. The nut is screwed on the projecting end of the bolt, with the sleeve 12 fitting in the bolt-hole of the fish-plate. When the slitted end of the sleeve reaches the tapering part 8 of the bolt, said end is expanded, as clearly shown in Fig. 1. The parts are so proportioned that when the nut is screwed home the part 8 will be in the space between the fish-plate and the web of the rail. The expansion of the sleeve therefore takes place in this space. In this position the nut cannot back off the bolt and will be securely locked thereon. The threads of the bolt are also firmly gripped, so that the bolt is held against turning. The sleeve also protects the threads on the bolt, as they do not come in contact with the bolt-hole.

Having thus described my invention, what is claimed as new, and desired to be secured by Letters Patent, is—

1. The combination with a threaded tapering bolt, of a nut having a projecting slitted sleeve, said nut and its sleeve being screwed on the bolt, and the sleeve being expanded by the bolt.

2. The combination with a rail and its fish-plate, of a tapering bolt extending therethrough, and a nut having a projecting sleeve, said nut and its sleeve being screwed on the bolt, and the sleeve being expanded by the bolt in the space between the fish-plate and rail-web.

3. The combination with a rail and its fish-plate, of a tapering bolt extending therethrough, and a nut having a projecting slitted sleeve, said nut and its sleeve being screwed on the bolt, and the sleeve being expanded by the bolt in the space between the fish-plate and rail-web.

4. The combination with a rail and its fish-plate, of a tapering bolt extending therethrough, and a nut having a projecting sleeve, said nut and its sleeve being screwed on the bolt, and with the sleeve extending through the bolt-hole in the fish-plate, and said sleeve being expanded by the bolt in the space between the fish-plate and the rail-web.

In testimony whereof I have signed my name to this specification in the presence of two subscribing witnesses.

JOHN W. FUQUA.

Witnesses:
A. S. ATKINSON,
H. M. RILEY.